March 27, 1934.  O. HITSHEW  1,952,804
WARNING SIGNAL
Filed Jan. 28, 1933   2 Sheets-Sheet 1
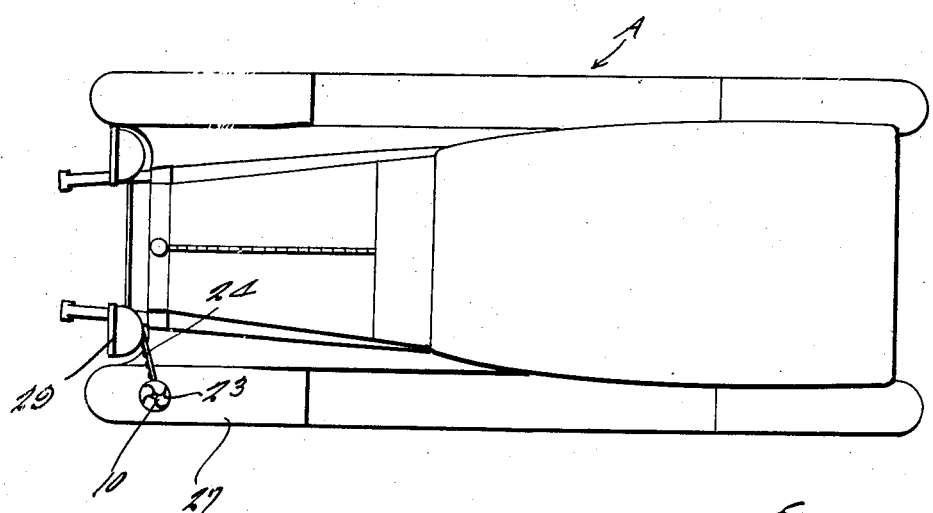
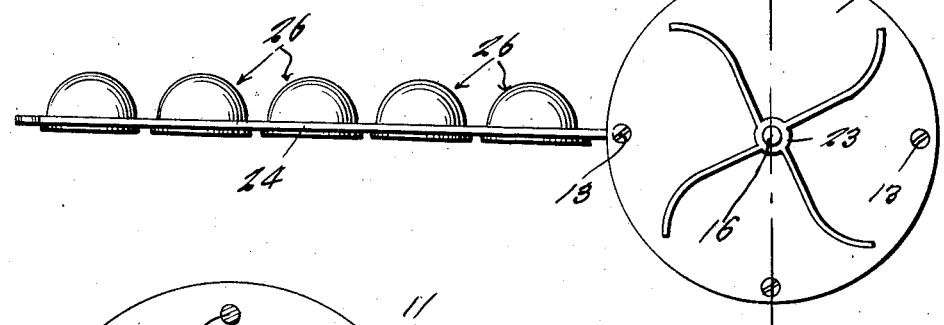
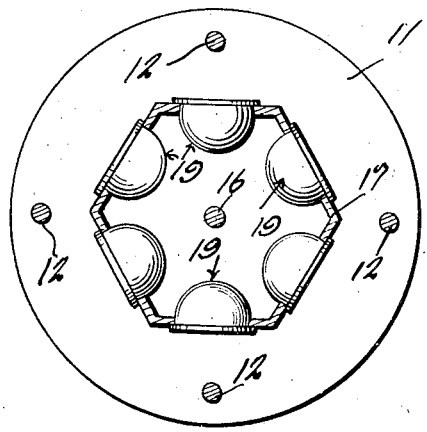
Inventor
Oliver Hitshew
By (signature)
Attorney

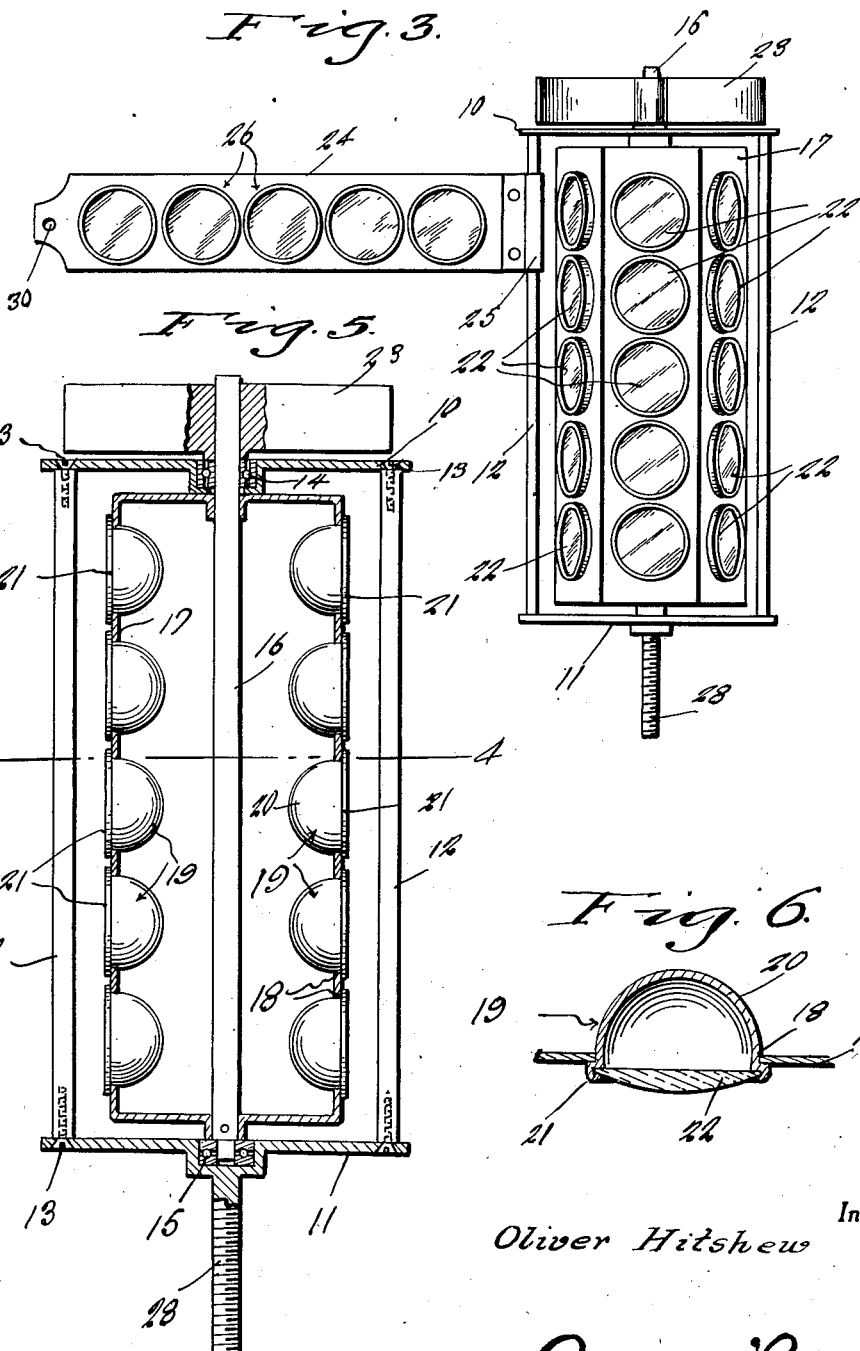

Patented Mar. 27, 1934

1,952,804

UNITED STATES PATENT OFFICE 1,952,804

WARNING SIGNAL

Oliver Hitshew, Keeline, Wyo.

Application January 28, 1933, Serial No. 654,070

1 Claim. (Cl. 88—1)

This invention relates to a warning signal particularly adapted to be mounted on motor driven vehicles for the purpose of warning the operator of an approaching vehicle of the proximity of the signal equipped vehicle; and for also enabling the operator of the approaching vehicle to clearly distinguish the outline of the vehicle carrying the signal.

Briefly the invention consists in the provision of a warning signal of the character above suggested whereby the light rays from an approaching automobile will be reflected regardless of what might be the relative angular position of the approaching automobiles and will enable the operator of the approaching vehicle to ascertain on which side of the other automobile the warning signal is mounted so that the likelihood of a collision will be eliminated.

The invention together with its numerous objects and advantages will be best understood from a study of the following description, taken in connection with the accompanying drawings wherein:

Figure 1 is a plan view of an automobile having the invention mounted thereon.

Figure 2 is a top plan view of the signal.

Figure 3 is an elevational view thereof.

Figure 4 is a horizontal sectional view taken substantially on the line 4—4 of Figure 5.

Figure 5 is a vertical sectional view taken substantially on the line 5—5 of Figure 2.

Figure 6 is a fragmentary sectional elevational view showing a reflector unit and a mounting therefor.

Referring more in detail to the drawings it will be seen that the signal comprises a supporting frame that includes the top and bottom disks or plates 10, 11 which are removably secured to the ends of vertical posts 12 by screws or other fastening elements 13. The plates 10 and 11 are provided with alined bearings 14, 15 and journalled in the bearings are the ends of a vertical post 16 which at its upper end projects upwardly above the plate 10. Mounted on the post 16 for rotation therewith within the aforementioned frame is a revoluble reflector-signal which in the present instance comprises an elongated hollow body 17 of metal or other suitable material.

The body 17 is shown as a six-sided construction although it, is to be understood the same may be cylindrical or any other desired shape. Each of the sides or panels of the member 17 is provided with a vertical series of relatively spaced openings 18 is which are arranged reflectors designated generally by the reference character 19.

While the reflectors 19 may be of any suitable construction, in the present instance I have shown the same as comprising a substantially hemispherical or cup-shaped holder 20 fitting within the opening 18 and provided at its open side with an outstanding annular bead or flange to engage the member 17 about the opening 18. The bead or flange designated by the reference numeral 21 is provided with an internal circular groove for accommodating the peripheral edge of a colored "bull's eye" or other reflector lens 22. (See Figure 6).

On the upper end of the post 16 there is provided a fan 23 to provide the driving force for rotating the hexagonal body 17.

A second reflector or signal unit is provided and is in the nature of an arm extending from the aforementioned frame at substantially right angles to the axis of the hexagonal body 17.

This second named reflector comprises an oblong plate 24 provided at one end with a suitable attaching means 25 whereby it is secured to the desired one of the posts 12 to extend at right angles from the post. The arm 24 is provided with a longitudinal series of spaced apertures for accommodating reflector elements 26 which correspond in every detail to the reflector elements carried by the body 17 as hereinbefore fully described.

Referring now to Figure 1 it will be seen that in one application of the invention, the signal is mounted on the front left hand fender 27 of the automobile designated generally by the reference character A. To mount the signal on the fender the same is provided on the top thereof with an opening to accommodate threaded shank 28 depending from the bottom plate 11. Manifestly a nut or the like will be threadedly engaged with the shank to engage the under side of the fender for securing the signal in position.

The arm 24 is preferably of such a length as to extend and fully bridge the space between the frame of the signal and the adjacent headlight 29 of the automobile. At its free end the arm 24 is provided with an aperture 30 for accommodating a fastening element whereby the free end of the arm may be directly secured to the headlight casing. Preferably the frame of the signal is mounted slightly rearwardly with reference to the headlight 29 so that the arm 24 will be disposed at the angle suggested in Figure 1.

With the signal thus mounted on the automobile it will be apparent that upon the subjection of the fan 23 to a breeze, such as by movement of the automobile, the body 17 will be rotated, and upon the light rays of an automobile striking the bull eyes 22 of the reflectors 19 and 26 the light rays will be reflected warning the operator of the aproaching vehicle of the proximity of the signal equipped vehicle and also enabling the operator of the approaching vehicle to determine the outline of the signal equipped automobile and thus enable the operator to control his vehicle so as to avoid collision.

It is also to be understood that while I have shown both the reflector equipped elements 17 and 24 being used together, that the same may be used individually and when so used may be mounted and arranged at any desired location, for example the arm 24 may be mounted directly in front of the radiator, while the revolving element 17 and its associated parts might be mounted on a radiator cap, the position and location of the signal parts, whether used separately or independently being dependent of course upon the will of the operator.

Even though I have herein shown and described the preferred embodiment of the invention, it is to be understood that the same is susceptible of further changes, modifications and improvements coming within the scope of the appended claim.

Having thus described my invention, what I claim as new is:

In combination with a vehicle fender and headlight, a supporting frame provided with means for securing it to the fender, an arm extending laterally from the frame and provided at its free end with means whereby to secure it directly to the casing of said headlight, a revoluble member mounted in the frame and provided with a plurality of light reflecting units, and a plurality of light reflecting units mounted on said arm.

OLIVER HITSHEW.